(No Model.)
M. H. AVERY.
CLUTCH.
No. 516,422.  Patented Mar. 13, 1894.
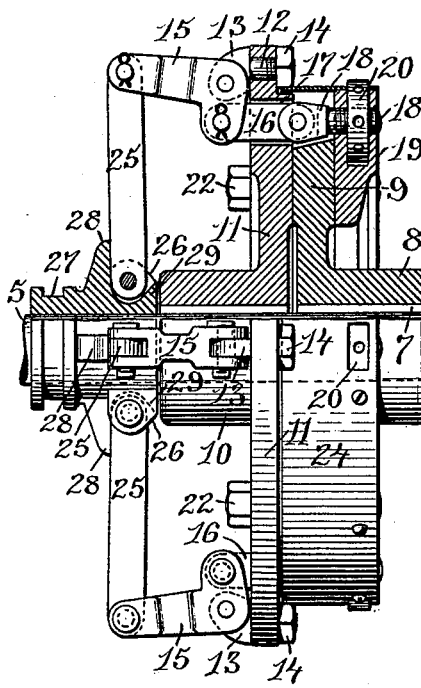
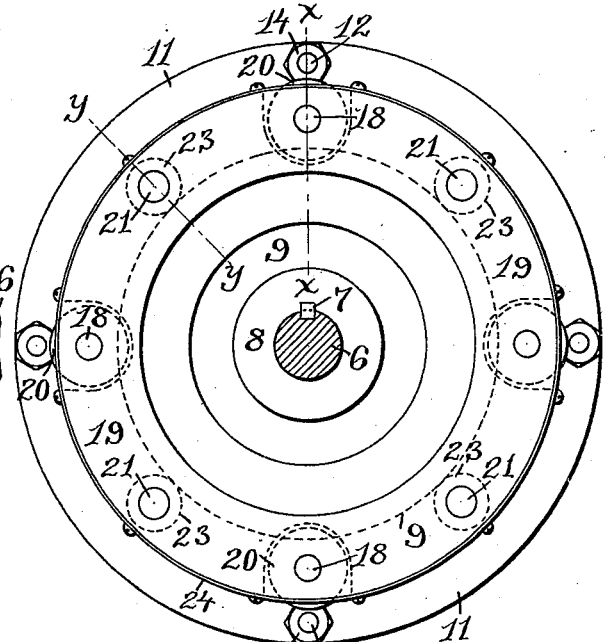
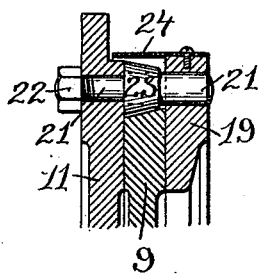
WITNESSES:
M. F. Bligh
Chas. H. Luther Jr
INVENTOR:
Morris H. Avery
by Joseph A. Miller & Co.
Attys

UNITED STATES PATENT OFFICE.

MORRIS H. AVERY, OF WOONSOCKET, RHODE ISLAND.

CLUTCH.

SPECIFICATION forming part of Letters Patent No. 516,422, dated March 13, 1894.

Application filed September 21, 1893. Serial No. 486,072. (No model.)

*To all whom it may concern:*

Be it known that I, MORRIS H. AVERY, of Woonsocket, in the county of Providence and State of Rhode Island, have invented certain new and useful Improvements in Clutches; and I hereby declare that the following is a full, clear, and exact description of the same, reference being had to the accompanying drawings, forming part of this specification.

This invention has reference to improvements in friction-clutches.

The object of the invention is to so construct a friction-clutch that the frictional parts of the same may be positively released from contact.

Another object is to so construct a clutch adapted to connect the ends of two shafts that these ends may be prevented from springing out of line and bringing the wear unduly on but a portion of the clutch-mechanism.

Another object is to produce a clutch, which, when brought into action, may be automatically locked.

Still another object is to produce a more efficient clutch than those heretofore constructed and to reduce the cost of construction.

The invention consists in the peculiar construction of the clutch, or friction disk, and the combination therewith of anti-friction bearings adapted to support the same in original alignment.

The invention also consists in the construction of the clamping-ring for operating the friction-disk together with the levers for positively moving this ring in both directions.

The invention still further consists in the construction of the shifting-collar and the levers operated thereby.

The invention also consists in the novel construction and arrangement of the roller-bearings.

The invention finally consists in such other novel features of construction and combination of parts as will hereinafter be more fully described and pointed out in the claims.

Figure 1 represents a side elevation of the improved clutch, partially in vertical section, on a line $x$—$x$ Fig. 2. Fig. 2 represents a face view of the same looking toward the clamping-ring. Fig. 3 represents a partial sectional view of the clutch taken on a line $y$—$y$ Fig. 2.

Similar numbers of reference designate corresponding parts throughout.

In the drawings 5 represents the end portion of a drive-shaft, and 6 the end portion of a shaft from pulleys on which machinery may be driven,—these shafts are journaled in suitable supports, the shaft 6 being driven by the shaft 5 through a clutch connection.

Keyed to the shaft 6 by means of the key 7, in such a manner as to prevent independent rotation while allowing of a certain amount of reciprocation, is the hub 8 having the circular friction-disk 9, the edge of this disk being beveled. To the shaft 5 is rigidly keyed the hub 10 having the friction-plate 11 of larger diameter than the friction-disk 9.

At intervals around the edge portion of the friction-plate 11 are perforations through which the bolts 12—12, carrying the flattened ears 13—13, extend, being secured by means of the nuts 14—14,—pivoted to these flattened ears 13—13 are the bell-crank levers 15—15 to the short arms of which are pivoted the connecting-arms 16—16, these pass through slots 17—17 in the friction-plate 11 and their inner ends are pivoted to the take-up bolts 18—18 which pass through the clamping-ring 19 being secured in the take-up nuts 20—20 located in sockets formed in the periphery of the clamping-ring. Through the friction-plate 11 are also formed perforations to receive the bolts 21—21 secured by the nuts 22—22 and having inner enlarged portions which are free to move through corresponding perforations in the clamping-ring 19 by which they are partially supported,—on the enlarged portions of these bolts 21—21 are journaled the conical friction-rolls 23—23 the surfaces of which bear against the beveled edge of the friction-disk 9 and tend to support the same against the spring of the shaft 6. The clamping-ring 19 is of larger diameter than the friction-disk and to its periphery is secured the dust-guard 24 having openings at suitable distances through which the take-up nuts 20 may be operated, the free edge of this dust-guard bears against the inner facets of the nuts 14 and serves as a locking-device therefor.

Pivoted to the long arms of the bell-cranks 15—15 are actuating-levers 25—25 which are pivoted at the other ends to the ears 26—26 of the shifting-sleeve 27. This sleeve is reciprocally mounted on the shaft 5 and may be operated in any suitable manner, being furnished with the bearing-studs 28—28 to limit the movement of the sleeve toward the clutch by bearing against the levers 25—25 after these have slightly passed the vertical, and with the shoulders 29—29 for limiting the movement of the sleeve away from the clutch by engaging the levers 25—25 when the sleeve 27 has been sufficiently moved to release the clamping-ring 19 and to allow the friction-disk to move clear of the friction-plate.

The clutch is operated by the shifting-sleeve 27, this being moved toward the clutch operates the bell-crank levers 15 through the actuating-levers 25 to draw the clamping-ring 19, by means of the connecting-arms 16 and take-up bolts 18, toward the friction-plate, thus drawing the friction-disk into intimate contact with the friction-plate,—as this is accomplished, the ends of the actuating-levers pivoted to the shifting-sleeve are brought slightly within the plane in which the outer ends of these levers lie and the clutch-mechanism is locked from any separation of the friction-plate and friction-disk independent of the shifting-sleeve.

In releasing the parts of the clutch the shifting-sleeve 27 is moved away from the clutch, the clamping-ring being at the same time positively moved in the opposite direction,—as the beveled edge of the friction-disk bears against the oppositely beveled surface of the conical roller-bearings 23 the tendency will be for the friction-disk to be driven away from contact with the friction-plate, this being greatly assisted by the slight spring of the shaft 6,—after the separation of the friction-disk and friction-plate, the friction-disk will be sustained, by means of the roller-bearings, in a plane parallel with that in which the friction-plate is running, by this means the undue sagging, or spring, of the end of the shaft 6 and the undue one-sided wearing of the friction-plate are prevented, as well as the wearing of the friction-disk.

The separating movement of the parts is limited both by the shape of the short arms of the bell-crank levers and by the bearing-shoulders 29 of the shifting-sleeve coming in contact with the actuating-levers.

Having thus described my invention, I claim as new and desire to secure by Letters Patent—

1. In a clutch, in combination, a friction-plate, roller-bearings carried by the plate, a friction-disk supported by the roller-bearings, and a device for moving the friction-disk into contact with the friction-plate.

2. In a clutch, the combination with a friction-plate, shafts carried by the plate, and conical-rolls journaled on the shaft, of a friction-disk having a beveled edge bearing on the rolls, and a device for moving the disk into contact with the friction-plate.

3. In a clutch, the combination with a friction-plate having perforations near its circumference and slots adjacent to said perforations, bolts carrying flattened ears secured in the perforations, bell-crank levers pivoted to the ears, connecting-arms pivoted to the short arms of the levers and extending through the slots in the friction-plate, and take-up bolts pivoted to the inner ends of the connecting-arms, of a clamping-ring, take-up nuts, carried by said ring, in which the ends of the take-up bolts are secured, a dust-guard secured to the periphery of the clamping-ring, and a friction-disk located between the clamping-ring and the friction-plate and adapted to be drawn into contact with the friction-plate, as described.

4. In a clutch, the combination with a friction-plate, a friction-disk, a clamping-ring for operating the friction-disk, bell-crank levers pivoted to ears carried by the friction-plate, and connections between one arm of each bell-crank and the clamping-ring for operating the disk, of a shifting-sleeve having the studs 28 and shoulders 29, and actuating-levers pivoted to the shifting-sleeve and to the remaining arms of the bell-cranks, as described.

5. In a clutch, the combination with the friction-plate 11, the bolts 21 secured through perforations therein, and the conical-rolls 22 journaled on said shafts, of the clamping-ring 19 having perforations to receive the ends of the shafts 21, and the friction-disk 9 located between the plate 11 and ring 19 and having a beveled edge, as described.

6. The combination with the hub 10 adapted to be rigidly keyed to a shaft and having the friction-plate 11 furnished with the slots 17, the bolts 12 having ears 13 secured through perforations in the friction-plate near the edge of the same, the shaft-bolts 21 secured through similar perforations intermediate those of the bolts 12, conical-rolls 23 journaled on the bolt-shafts, the bell-crank levers 15 pivoted to the ears 13, the actuating-levers 25 pivoted to the long arms of the bell-cranks, the shifting-sleeve 27 to ears on which the other ends of the actuating-levers are pivoted, the connecting-arms 16 pivoted to the short arms of the bell-cranks and extending through the slots 17, and the take-up bolts 18 pivoted to the inner ends of the connecting-arms, of the clamping-ring 19 having peripheral sockets and perforations to receive the ends of the shaft bolts 21, take-up nuts 20 located in said sockets adapted to engage the ends of the take-up bolts 18, a dust-guard 14 secured to the clamping-ring, and the friction-disk 9, having the hub 8 and a beveled edge, located between the friction-plate and the clamping-ring, as described.

In witness whereof I have hereunto set my hand.

MORRIS H. AVERY.

Witnesses:
HENRY J. MILLER,
JOSEPH A. MILLER, Jr.